(12) United States Patent
Takaku

(10) Patent No.: US 7,099,491 B2
(45) Date of Patent: Aug. 29, 2006

(54) CONTENTS FORMING METHOD AND CONTENTS REPRODUCING APPARATUS AND METHOD

(75) Inventor: Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 10/276,808

(22) PCT Filed: May 24, 2001

(86) PCT No.: PCT/JP01/04367

§ 371 (c)(1),
(2), (4) Date: Nov. 19, 2002

(87) PCT Pub. No.: WO01/91052

PCT Pub. Date: Nov. 29, 2001

(65) Prior Publication Data

US 2003/0163430 A1    Aug. 28, 2003

(30) Foreign Application Priority Data

May 26, 2000 (JP) .............................. 2000-156391
Aug. 31, 2000 (JP) .............................. 2000-264295

(51) Int. Cl.
*G06K 9/00* (2006.01)

(52) U.S. Cl. ..................... 382/100; 382/235; 380/201

(58) Field of Classification Search .............. 382/100, 382/103, 107, 168, 180, 232, 233, 235, 236, 382/243, 250, 254, 260, 276, 112; 715/716; 713/176; 705/54; 375/240.25; 358/539; 380/201

See application file for complete search history.

(56) References Cited

U.S. PATENT DOCUMENTS 6,272,634 B1 * 8/2001 Tewfik et al. ............... 713/176
6,411,725 B1 * 6/2002 Rhoads ........................ 382/100
6,418,421 B1 * 7/2002 Hurtado et al. ................ 705/54
6,510,233 B1 * 1/2003 Nakano ....................... 382/100
6,674,874 B1 * 1/2004 Yoshida et al. ............. 382/100
6,763,071 B1 * 7/2004 Maeda et al. ........... 375/240.25
6,850,252 B1 * 2/2005 Hoffberg ..................... 715/716

FOREIGN PATENT DOCUMENTS

EP          0 969 668 A2     1/2000
WO          WO 99/48296      9/1999

OTHER PUBLICATIONS

Open Platform Initiative for Multimedia Access, "OPIMA Specification", 10th Meeting Turin, Version 1.0, pp. 1-42, Oct. 1999.
International Organisation for Standardization ISO/IEC JTC1/SC29/WG11/N2614 "MPEG 98" Coding of Moving Pictures and Audio, "MPEG-4 Intellectual Property Management & Protection (IPMP) Overview & Applications", pp. 1-8, Dec. 1998.

* cited by examiner

*Primary Examiner*—Kanjibhai Patel
*Assistant Examiner*—Seyed Azarian
(74) *Attorney, Agent, or Firm*—Fitzpatrick, Cella, Harper & Scinto

(57) ABSTRACT

A contents forming method for multi-media encoding method provided with an IPMP system, characterized by generating IPMP information containing identification information (404) for identifying the IPMP system type and version information (405) for identifying the intellectual property rights management and protection system version, and burying the IPMP information into contents.

48 Claims, 15 Drawing Sheets

FIG. 8

IPMP INFORMATION (PART) — 801

| IPMP SYSTEM TYPE | VERSION NUMBER | CIPHER CODE BEFORE BEING DECODED | ---- (DATA FIELD) |
|---|---|---|---|
| EXAMPLE 1000h | 02h | 03h | ---- |

CIPHER CODE CONVERSION TABLE
IPMPS_Type=100h — 802

| VERSION | CIPHER CODE | VERSION | CIPHER CODE | NOTE |
|---|---|---|---|---|
| 01h | 01h | 02h | 03h | DES |
| 01h | 02h | 02h | 01h | RC2 |
| 01h | 03h | 02h | 04h | RC4 |

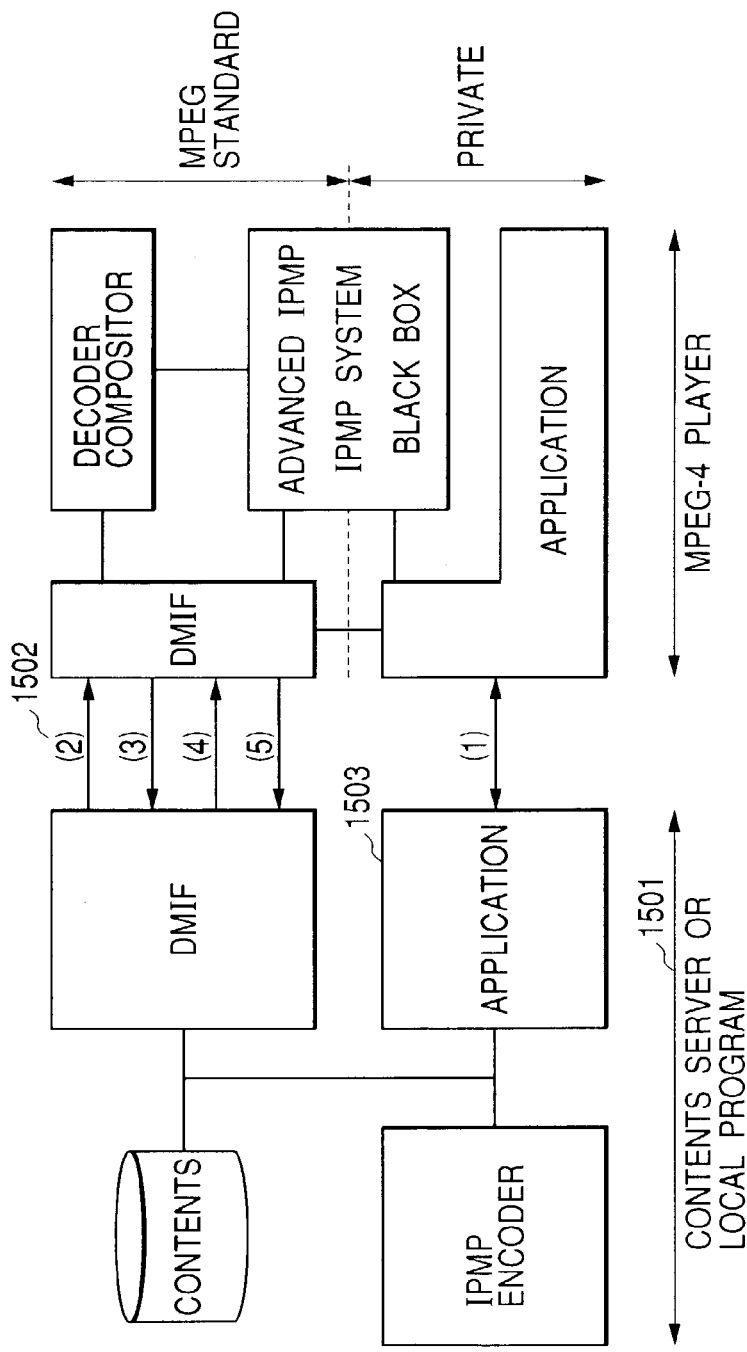

CONTENTS FORMING METHOD AND CONTENTS REPRODUCING APPARATUS AND METHOD

TECHNICAL FIELD

The present invention pertains to contents forming method, contents reproducing method and contents reproducing device for a multi-media encoding system equipped with an intellectual property rights (ex., copyright) management and protection system, and computer readable storage medium storing a program for executing the contents forming method or the contents reproducing method.

BACKGROUND ART

MPEG (Moving Picture Coding Experts Group) 4 and similar multi-media encoding systems (hereinafter referred to as MPEG-4) having a similar intellectual property rights (ex., copyright) management and protection system (IPMP system) are receiving much attention in the movie industry and other fields which place much importance on protection of copyrights. This is because such encoding systems have a system for protection of copyrights within the contents itself.

FIG. 1 is a schematic diagram of an MPEG-4 player explaining a copyright protection system of the MPEG-4. FIG. 1 was drafted based on "ISO/IEC 14496-1 FIG. 8", and detailed explanation thereof is abbreviated here.

As depicted in FIG. 1, an IPMP system 102 obtains information relating to copyright protection via an IPMP decode buffer 101, and processes this information. The IPMP system 102 is configured so as to be able to reference an object descriptor (OD) 103 while performing such operations as decoding code of each object such as voice or picture images and detecting digital watermarks.

On the other hand, specific commands regarding the decoding of the code and the detecting of the watermark, such as what sort of technique should be applied and what part should be processed, are generally written among the data read by the IPMP system 102 as the IPMP stream. In other words, the IPMP system 102 must be designed in advance so as to be able to interpret the contents of the IPMP stream.

The most important part of the IPMP stream, the IPMP message, is described in "ISO/IEC 14496-1 8.3.2.5 IPMP message syntax and semantics" as follows:

```
8.3.2.5.1 Syntax
class IPMP_Message( ) extends ExpandableBaseClass
{
    bit(16) IPMPS_Type;
    if(IPMPS_Type == 0){
        bit(8) URLString[sizeOfInstance-2];
    } else {
        bit(8)IPMP_data[sizeOfInstance-2];
    }
}
```

8.3.2.5.2 Semantics

The IPMP_Message conveys control information for an IPMP System. IPMPS_Type—the type of the IPMP System. A zero value does not correspond to an IPMP System, but indicates the presence of a URL. A Registration Authority as designated by the ISO shall assign valid values for this field.

URLString[ ]—contains a UTF-8[3] encoded URL that shall point to the location of a remote IPMP_Message whose IPMP_data shall be used in place of locally provided data.

IPMP_data—opaque data to control the IPMP System.

What is important here is that the IPMP system type (IPMPS_Type) can uniquely identify the specifications of the data, being the main part of the IPMP stream, and that the contents of the data portion (IPMP_data) are not particularly determined.

That is, it is presumed that the contents formation system can understand the IPMP system used by a contents reproducing device (such as a player), and the IPMP message must be buried into the multi-media data which is the contents.

Further, from the perspective of the contents reproducing device (i.e., the player), it is necessary to examine the IPMP system type (IPMPS_Type) in order to determine whether it will be possible to interpret the IPMP message in the multi-media data that the player will attempt to reproduce.

Thus, in the prior art, in order to transfer IPMP data that could be understood by both the contents formation system and the reproducing device in advance, one had to use IPMP system type as one's sole starting point.

As described above, in the conventional MPEG-4 and conventional contents formation systems and contents reproducing devices having intellectual property rights management and protection systems (i.e., IPMP systems) similar to MPEG-4 for use in multi-media encoding systems similar to MPEG-4, the means for verifying the IPMP data for activating the intellectual property rights (ex., copyright) protection system relied solely on the IPMP system type (IPMPS_Type). Thus, there existed the following problems.

(1) In the case that an IPMP message defined in a specific IPMP system type is read by an ill-intentioned external third party, the IPMP message may be switched over to a new protection system. However, in order to use a message of the new protection system, it is necessary to register the new IPMP system type with the RA (registration authority), even if the change is minimal. It is also necessary to establish an IPMP system having a different IPMP system type from the previous IPMP system type and an IPMP system that can interpret the IPMP stream. As a result, the contents formation system and the contents reproducing device needs a redundant process recognizing multiple IPMP system types registered with the RA, and thus, decreases in processing efficiency and increases in memory usage may occur.

(2) Also, in the process of upgrading, in a case where the IPMP system type remains the same while the IPMP stream is generated with partially-different data specifications, since the IPMP system type is the only reference for the contents reproducing device for verifying whether the IPMP message can be interpreted or not, the IPMP system type is no longer identifiable uniquely. Thus, inconvenient runaway processing may occur.

(3) Even when the IPMP system of the contents reproducing device responds correctly to the sent IPMP message, there can still be instances in which the IPMP system cannot operate properly. In this case, there is no way for the contents reproducing device to inform the side that sent the contents that the IPMP system did not operate properly.

(4) For example, there are instances in which it is presumed that the side sending the contents will convert the contents into an IPMP message of an IPMP system type that the contents reproducing device corresponds to, and then send the contents. However, in such instances, the contents-sending side cannot provide instruction as to when the contents reproducing device should give notification of the IPMP system type that the contents reproducing device corresponds to.

(5) The IPMP message is one stream buried into the contents; therefore, in the case when no contents exist, it is impossible to perform a test or tests of conditions by means of standard technique based on the MPEG-4. Also, there is no method available for testing the IPMP during reproduction in a way that does not influence the reproduction. Thus, there exists no test method that is standard across different devices, and there is no chance of guaranteeing compatibility across the respective devices.

(6) Related to the above problems, it is impossible to request a communication path protected by security technology from the contents reproducing device to a so-called "back channel" of the side sending the contents.

The above-mentioned problems are based on the need in an IPMP system to guarantee unique identifiability and to guarantee security such that details of such the indentificability are not generally disclosed. This unique identifiability and this security rely on the contents forming device and method, and the operation of the contents reproducing device and method. In the prior art, in order to resolve these problems, it was necessary to apply extremely complicated control systems. When these types of resolutions are applied to portable apparatus with limited processing power and memory, it is particularly difficult to avoid problems.

In light of the above-mentioned issues, an object of the present invention is to provide a contents forming method, a contents reproducing method, a contents reproducing device and a computer readable storage medium storing a program for executing the contents forming method or the contents reproducing method, being capable of performing more efficient processing by adding discrepancy (version) information or request information of IPMP data, in addition to the IPMP system type in the IPMP stream, in an encoding system of MPEG-4 with an IPMP system or an encoding system with an IPMP system that is similar to the MPEG-4.

DISCLOSURE OF INVENTION

The contents forming method of the present invention is related to a contents forming method for multi-media encoding system provided with an intellectual property rights management and protection system, and is characterized by: generating intellectual property rights management and protection information containing identification information for identifying the intellectual property rights management and protection system type and version information for identifying the intellectual property rights management and protection system version; and burying the intellectual property rights management and protection information into contents.

Further, the contents reproducing method of the present invention is related to a contents reproducing method for multi-media encoding format provided with an intellectual property rights management and protection system, and is characterized by: inputting contents having intellectual property rights management and protection information buried therein, the intellectual property rights management and protection information containing identification information for identifying the intellectual property rights management and protection system type and version information for identifying the intellectual property rights management and protection system version; detecting the identification information and the version information; and making the intellectual property rights management and protection system operate in accordance with the detection results.

Further, the contents reproducing device of the present invention is related to a contents reproducing device for multi-media encoding format provided with an intellectual property rights management and protection system, and is characterized by input means for inputting contents into which intellectual property rights management and protection information has been buried, the intellectual property rights management and protection information containing identification information for identifying the intellectual property rights management and protection system type and version information for identifying the intellectual property rights management and protection system version; a detecting means for detecting the identification information and the version information; and a control means for making the intellectual property rights management and protection system operate in accordance with the detection results.

Further, the contents forming method of the present invention is related to a contents forming method for multi-media encoding format provided with an intellectual property rights management and protection system, and is characterized by: generating intellectual property rights management and protection information containing identification information for identifying the intellectual property rights management and protection system type and additionally, a request for notification when an exception occurs, a request for notification of information about the intellectual property rights management and protection system, information notifying that data is imitation data on which processing relating to multi-media encoding is not actually to be performed, a communication request, an authentication processing request, a request for secure communications protected by means of ciphering or another technology, or information made up of a combination of those requests and information and burying the intellectual property rights management and protection information into contents.

Further, the contents reproducing method of the present invention is related to a contents reproducing method for multi-media encoding format provided with an intellectual property rights management and protection system, and is characterized by: inputting contents into which there have been buried intellectual property rights management and protection information containing: identification information for identifying the intellectual property rights management and protection type and additionally, a request for notification when an exception occurs, a request for notification of information about the intellectual property rights management and protection system, information notifying that data is imitation data on which processing relating to multi-media encoding is not actually to be performed, a communication request, an authentication processing request, a request for secure communications protected by means of ciphering or another technology, or information made up of a combination of those requests and information; detecting identification information for identifying the intellectual property rights management and protection system type, and the above described requests and information; and making the intellectual property rights management and protection system operate in accordance with the detection results.

Further, the contents reproducing device of the present invention is related to a contents reproducing device for multi-media encoding format provided with an intellectual property rights management and protection system, and is characterized by an inputting means for inputting contents into which there have been buried intellectual property rights management and protection information containing identification information for identifying the intellectual property rights management and protection type and additionally, a request for notification when an exception occurs, a request for notification of information about the intellectual property rights management and protection system, information notifying that data is imitation data on which processing relating to multi-media encoding is not actually to be performed, a communication request, an authentication processing request, a request for secure communications protected by means of ciphering or another technology, or information made up of a combination of those requests and information; a detection means for detecting identification information for identifying the intellectual property rights management and protection system type; and a control means for making the intellectual property rights management and protection system operate in accordance with the detection results.

BRIEF DESCRIPTION OF DRAWINGS

FIG. 8 is a diagram for explaining a conversion of data among the IPMP data, in accordance with the first embodiment of the present invention;

FIG. 15 is a block schematic diagram used in DMIF, in accordance with the second embodiment of the present invention.

BEST MODE FOR CARRYING OUT THE INVENTION

Hereinafter, detailed explanation is made of a first embodiment of the present invention with reference to the drawings.

Figure 1:
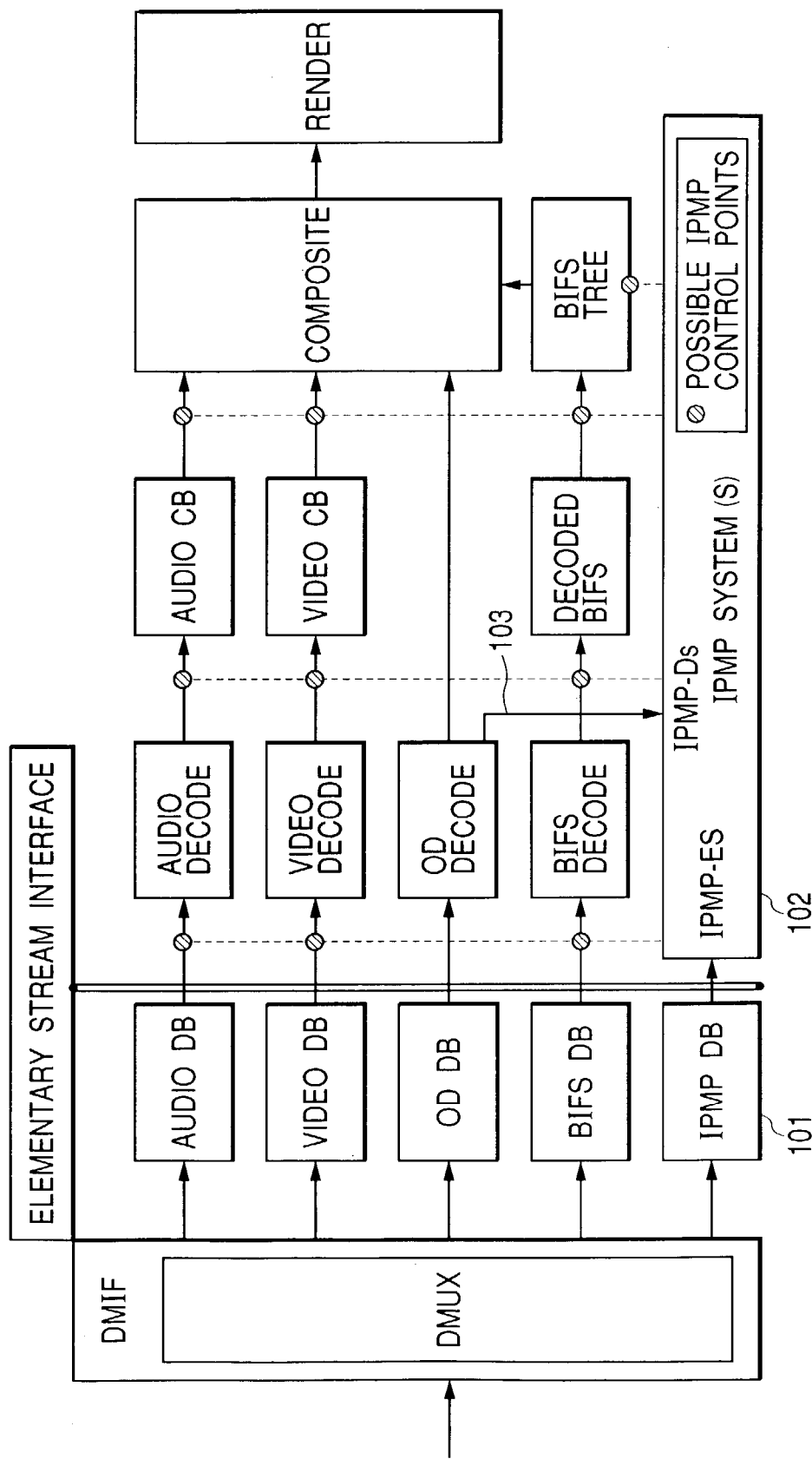
FIG. 1 is a diagram for explaining an MPEG-4 player in accordance with the prior art
Figure 2:
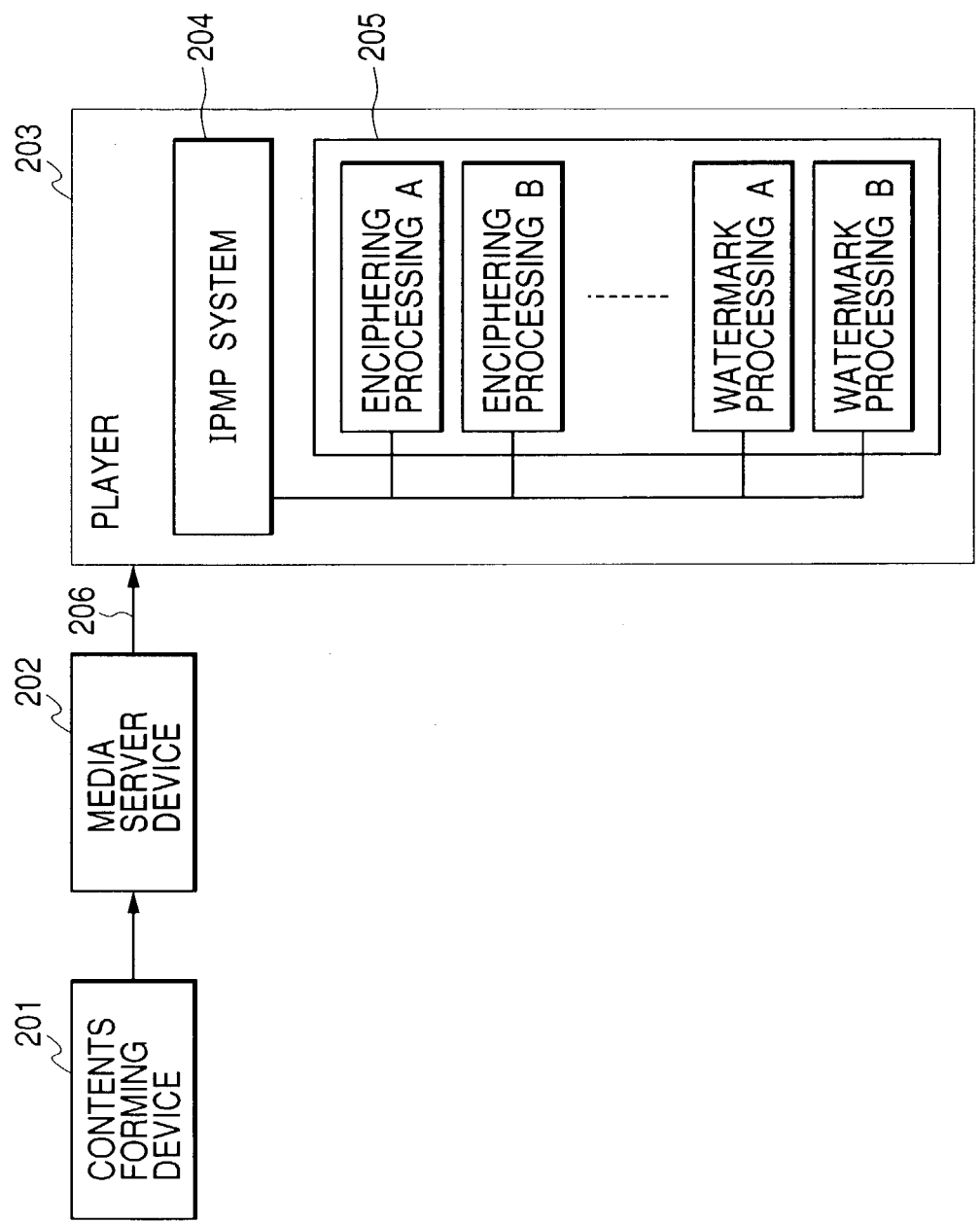
FIG. 2 is a diagram schematically explaining an entire system explaining a first embodiment of the present invention.

FIG. 2 is a diagram schematically explaining an entire system explaining a first embodiment of the present invention.

This system is constructed of a contents forming device 201 for generating a multi-media data stream containing intellectual property rights (in particular copyrights, but not limited to copyrights) management and protection information of MPEG-4 for example; a media server device 202 for distributing and providing the multi-media data stream; a player 203 for requesting and reproducing the multi-media data stream; and an IPMP system 204 for performing intellectual property rights management and protection in close interrelation with the player.

Further, there are some cases in which the IPMP system 204 incorporates a module 205 that is used by the IPMP system 204, such as an enciphering processing module or a watermark processing module, having functions necessary for protecting and managing intellectual property rights.

Note that a multi-media stream 206 etc. are transmitted between the media server device 202 and the player 203. This transmission relies on a system provided by the media server device 202, and there are some cases in which the transmission takes place by RTP (real-time transport protocol), and some cases in which the transmission takes place as a pure file transfer done by FTP (file transfer protocol). Alternatively, the media server device 202 may be a file access device such as a CD-ROM drive.

First, a summary of the flow of the processing is explained using the example of the entire system shown in FIG. 2, in order to make the explanation of this embodiment easier.

First, the multi-media data including intellectual property rights management and protection (IPMP) information of the MPEG-4 for example is formed by the contents forming device 201. This process may be performed in advance, or may be performed each time there is a request. What is important is that the IPMP information is included among the multi-media data, and an IPMP system type (IPMPS_Type) for uniquely identifying the protection system and a version number thereof are included.

Specifically, data containing the IPMPS_Type and a version number is generated as information which indicates what sort of protection was performed, and at the same time, protects data by enciphering or adding watermark data to a portion of or all of the data that is to be protected.

The media server device 202 distributes this protected data in accordance with requests from the player 203 and specifications of the multi-media data distribution system. As mentioned above, there are also situations in which the distribution is carried out by reading data having been formed and protected in advance from a recording device such as a CD-ROM.

The player 203 reads the multi-media data including the protected data, and performs reproduction of the multi-media data in accordance with a multi-media data standard. At this time, in the case that the IPMP information is included among the multi-media data, the IPMP system 204 performs that processing. In the case that the IPMPS_Type information showing what sort of protection was performed is included, reference is made to this information, and enciphering method or watermark method processing corresponding to the indicated IPMPS_Type and the version number is performed in a fashion. There are also situations in which this processing is handled, as necessary, by the enciphering processing module or the watermark processing module.

As a result, the enciphering processing etc. performed on the multi-media data is decoded, and the player can reproduce the multi-media data.

Note that, in accordance with the MPEG-4 version 1 standard (ISO/IEC 14496), the IPMPS_Type is the only information for uniquely identifying the method used for the intellectual property rights management and protection. In the event that the IPMPS_Type indicated therein is not an IPMPS_Type that the player can interpret, this IPMP information cannot be completely processed.

The discussion now turns to operations of the player in the case when the IPMPS_Type contained in the multi-media data matches with IPMPS_Types that the player can interpret. Explanation is made in detail of processing conducted based on the version number which is a characteristic of the present invention, and will be made with reference to a case in which the version information stored in the multi-media data is a single piece of version information, and another case in which the information is 2-tiered version information. The former case is explained first, and then the latter case is explained.

First, explanation is made of the case in which the multi-media data is a single-piece of version information.

Figure 3:
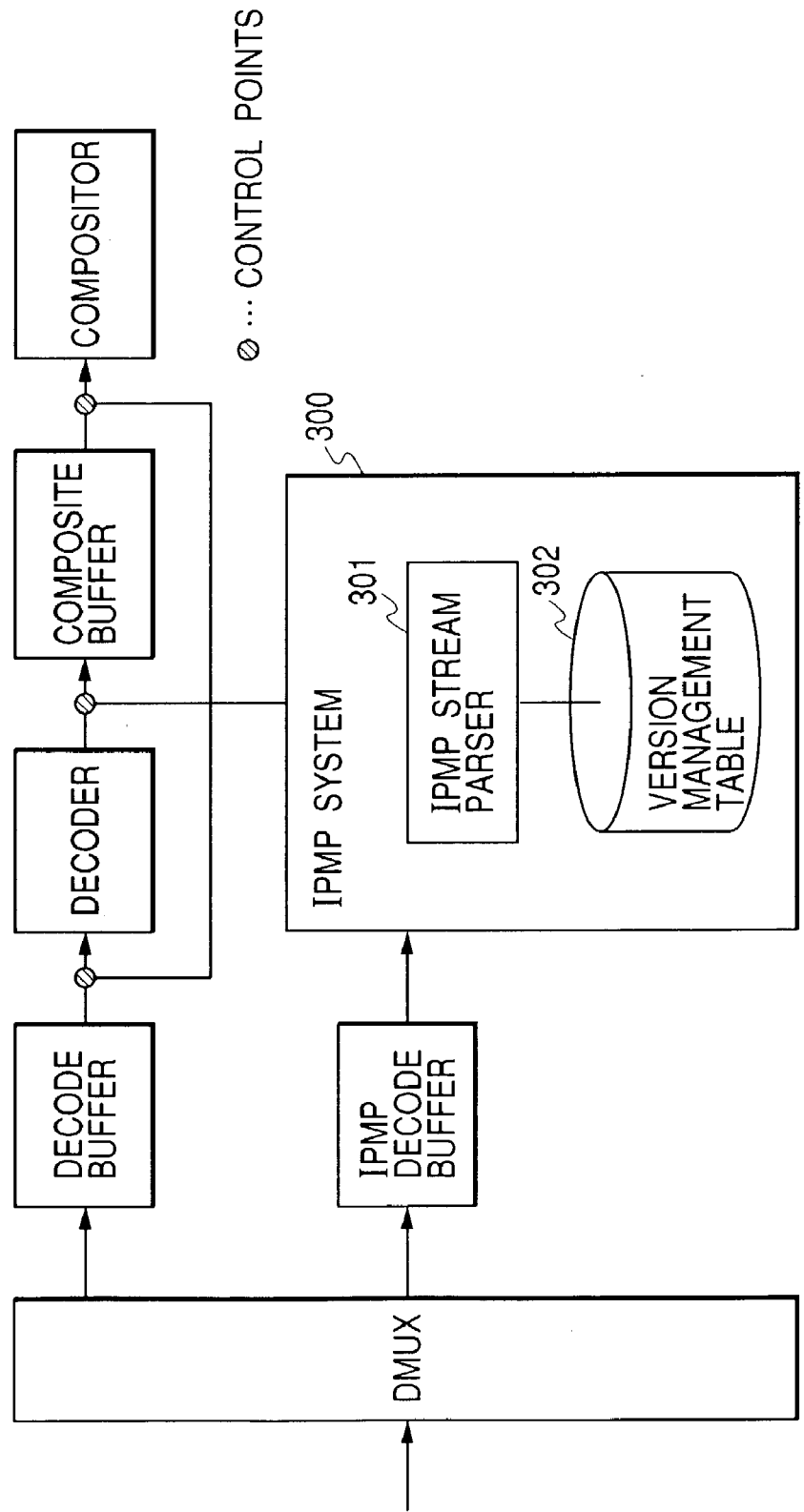
FIG. 3 is a block diagram showing a construction of an IPMP system in accordance with the first embodiment of the present invention, with focusing on a characterizing portion thereof.

FIG. 3 is a block diagram showing a construction of an IPMP system of the present invention, with focusing on a characterizing portion thereof.

The IPMP system 300 includes a variety of functions relating to reproduction of the multi-media data. Here, an IPMP stream parser 301 for interpreting the so-called IPMP stream containing the IPMP information itself and a version management table 302 for managing the IPMPS_Type and the version number thereof are expressly depicted. There are also situations in which the IPMP system 300 performs different operations depending on the IPMPS_Type. However, the control point etc. for actually controlling the intellectual property rights protection and the like are explained in the MPEG-4 version 1 standard (ISO/IEC 14496). A part of the present invention that is similar to this is also depicted in FIG. 3.

The IPMP stream parser 301 actually reads the IPMP information and performs interpretation thereof. Further, the version management table 302 is constructed of the IPMP system type, version number, information about compatibility, etc. The IPMP system can obtain this information about compatibility, etc. by referencing the version management table 302.

In order to provide a more concrete explanation, examples are explained hereinafter of the IPMP information containing the version number, being a characteristic of the present invention, and the version management table.

Figure 4:
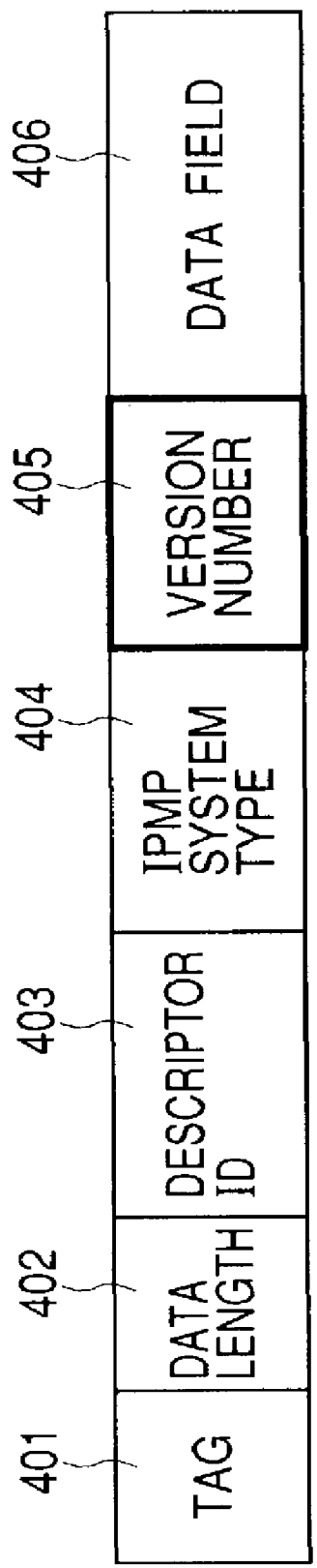
FIG. 4 is a diagram showing a construction of IPMP information containing a version number in accordance with the first embodiment of the present invention.

As shown in FIG. 4, the IPMP information is constructed of a tag 401, a data length 402, a descriptor ID 403, an IPMP system type 404, a version number 405 and a data field 406.

This construction is an expansion of the following IPMP_data in the definition of the IPMP_Descriptor as defined by the MPEG-4 version 1 standard (ISO/IEC 14496):

```
(8.6.13.1 Syntax)
class IPMP_Descriptor( ) extends BaseDescriptor : bit(8)
    IPMP_DescrTag
```

```
{
    bit(8) IPMP_DescriptorID;
    unsigned int(16)  IPMPS_Type;
    if (IPMPS_Type == 0) {
        bit(8) URLString[sizeOfInstance-3];
    } else {
        bit(8) IPMP_data[sizeOfInstance-3];
    }
}
```

The above IPMP_data is expanded and added with the version number. The IPMP information of the present invention could be defined in a fashion similar to that of the above MPEG-4 version 1 standard as follows:

```
Class IPMP_Descriptor( ) extends BaseDescriptor : bit(8)
    IPMP_DescrTag
{
    bit(8) IPMP_DescriptorID;
    unsigned int(16)  IPMPS_Type;
    if (IPMPS_Type == 0) {
        bit(8) URLString[sizeOfInstance-3];
    } else {
        if ( HasVersion( IPMPS_Type ) == TRUE ) {
            bit(8) IPMP_Version;
            bit(8) IPMP_data[sizeOfInstance-4];
        } else {
            bit(8) IPMP_data[sizeOfInstance-3];
        }
    }
}
function BOOLEAN HasVersion( unsigned int(16)
    IPMPS_Type );
```

Here, the HasVersion function returns the Boolean algebra "TRUE" when IPMPS_Type contains the version number.

Figure 5:
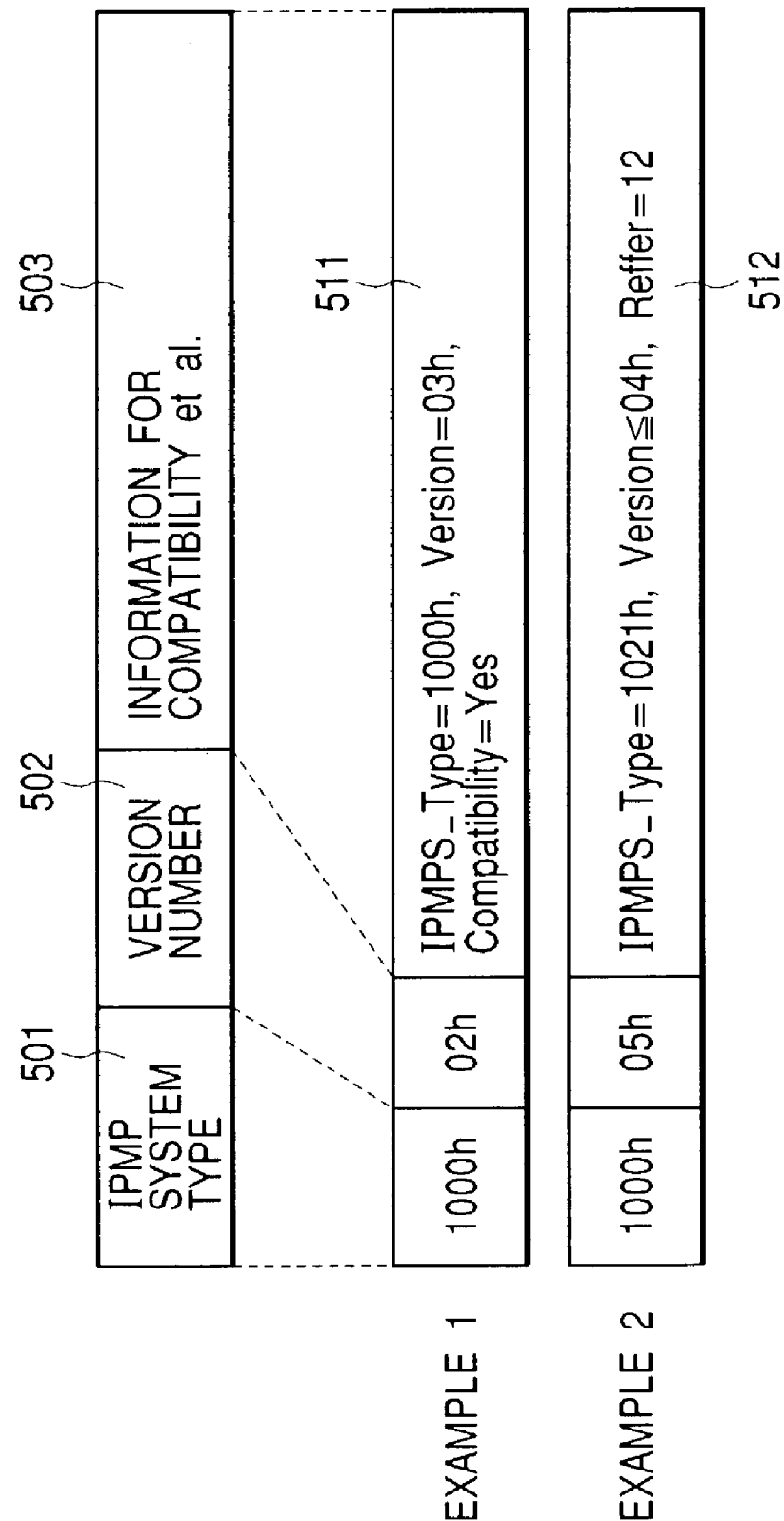
FIG. 5 is a diagram showing an example of a version management table in accordance with the first embodiment of the present invention.

The version management table 302 (see FIG. 3), as shown in FIG. 5, is constructed of an IPMP system type 501, a version number 502, and information about compatibility, etc. 503.

The information about compatibility, etc. can store information about whether compatibility is maintainable with a specific version of a given IPMP system type, and can store data conversion information for achieving compatibility with an IPMP_data portion defined for each IPMP system.

For example, Example 1 (511) of FIG. 5 shows that an IPMP system contained in the IPMP information and having an IPMP system type of 1000h and a version number of 02h is compatible with an IPMP system type of 1000h and version number of 03h.

Further, Example 2 (512) of FIG. 5 is a more complicated example, showing that, when the IPMP system type is 1000h and the version number is 05h, in the case when the IPMP system has an IPMP system type of 1021h and a version number of 04h or less, data contained in a data field 406 (see FIG. 4) can be interpreted by converting the data according to a conversion method of a reference number "12".

Note that the details of the version management table 302 shown in the above-mentioned example are determined by the actual implementation of the IPMP system and are inherent to the system. Thus, the details in the above-mentioned example do no limit the present invention.

Figure 6:
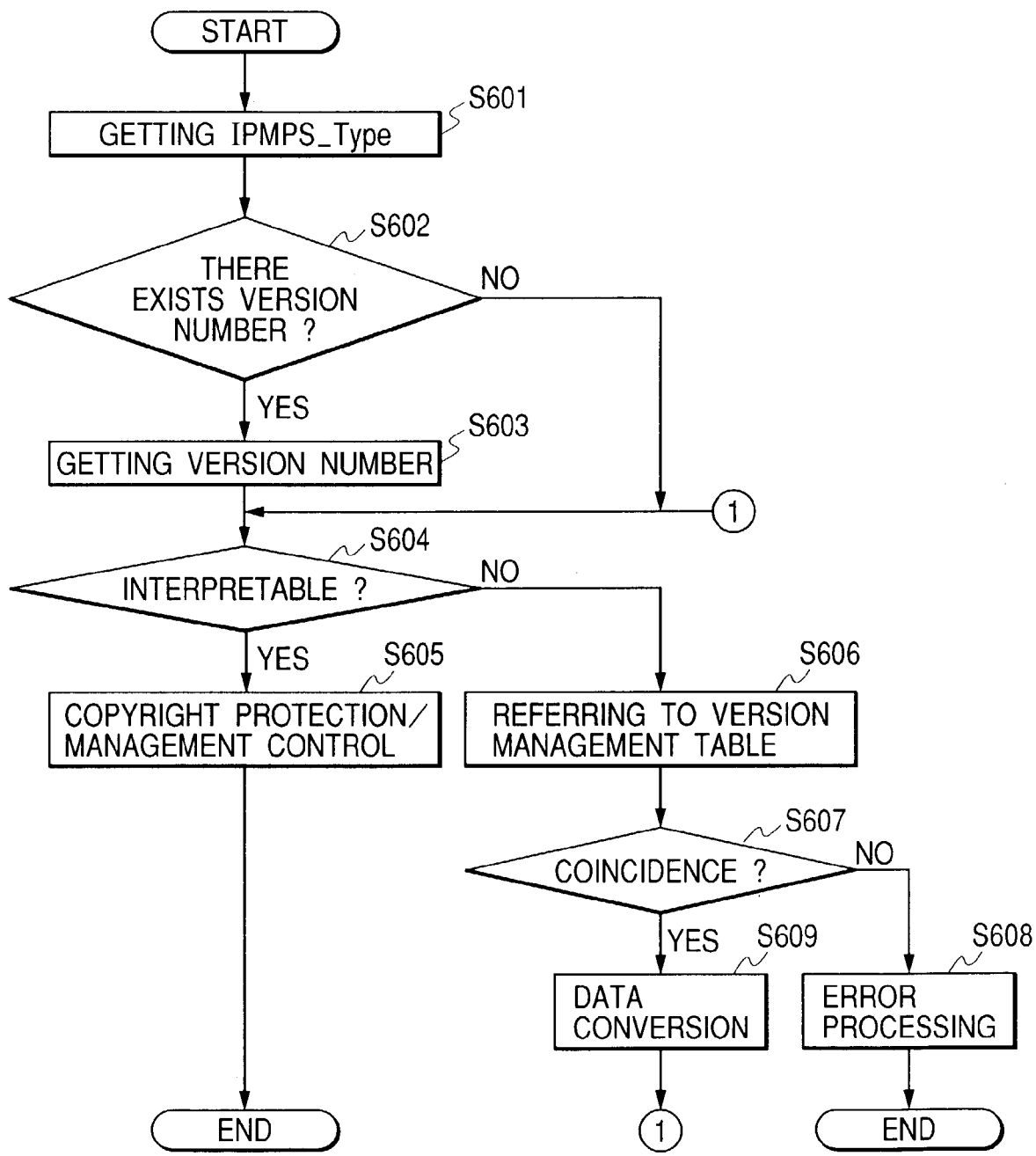
FIG. 6 is a flow chart showing a processing sequence in accordance with the first embodiment of the present invention.

Next, the flow chart of FIG. 6 will be used to explain a processing sequence in accordance with this embodiment.

First, the IPMP system type (IPMPS_Type) is obtained from the IPMP information contained in the multi-media data (step 601).

Next, it is determined whether there exists a version number or not (step 602). The MPEG-4 version 1 standard (ISO/IEC 14496) does not necessarily define whether a version number exists or not; therefore, it is necessary to make the determination based on the IPMP system type. However, the specific method for doing this is determined by the application method and implementation, so explanation thereof is omitted here.

In the case that a version number does exist at step 602, the version number is obtained (step 603).

In the case that the IPMPS_Type and the version number are obtained, or in the case that only the IPMPS_Type is obtained, this information is used for determining whether interpretation is possible or not (step 604).

In the case that interpretation is possible at step 604, copyright protection controls relating to the IPMP are performed (step 605). In the case that interpretation is not possible, the version management table is referred to (step 606).

At step 606, a search is performed for a combination of a corresponding IPMPS_Type and version number from the version management table (step 607). In the event that the results of this search do not match, error processing (step 608) begins. On the other hand, when the results do match, data conversion processing (step 609) is performed, a second determination is made as to whether interpretation is possible or not (step 604), and the intellectual property rights protection/management controls are performed (step 605).

In the above-described processing operation flow, it has been assumed in order to make the explanation simpler, that the definition loop of the version management table has been turned off. However, of course, it goes without saying that when the definition loop starts in the course of actual implementation, necessary procedures for responding to this loop are performed as well. The definition loop here refers to the situation of cyclical defining such as when the data that has been converted by referring to the version management table refers again to the version management table.

When the MPEG-4 version 1 standard (ISO/IEC 14496) is being used, even a minimal change to the IPMP information cannot be determined by the IPMP system for interpreting the IPMP information, unless the IPMP system type for uniquely identifying the IPMP information is changed. This means that there is a possibility of causing an inconvenience such that the IPMP system begins runaway processing. This problem is dealt with at the IPMP system implementation level.

However, as explained above, the player having the IPMP system for managing the version information is combined with the contents forming device for generating the multi-media stream containing IPMP information corresponding to the player. This produces the result that the player can control different IPMP information even if the player does not have a plurality of IPMP systems corresponding to each set of IPMP information.

Next, explanation is made of a case in which the version information stored in the multi-media data is the 2-tiered version information.

Figure 7:
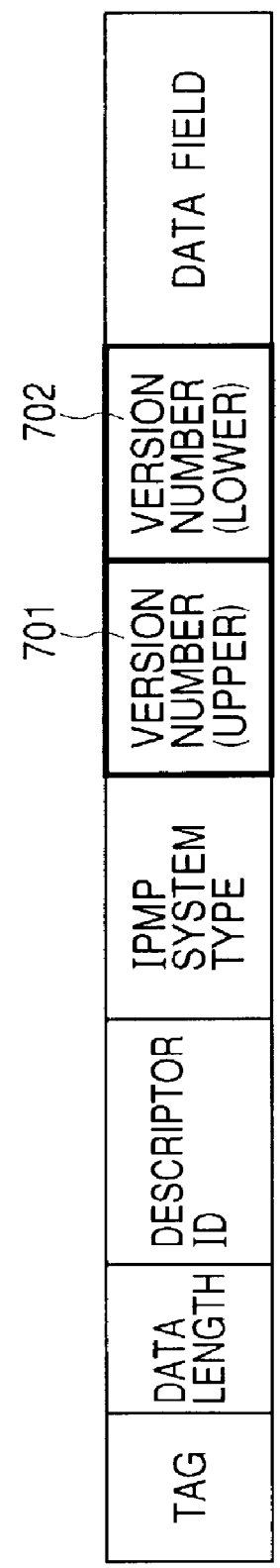
FIG. 7 is a diagram showing an example of the IPMP information expanded to include a 2-tiered version number, in accordance with the first embodiment of the present invention.

FIG. 7 is an example of the IPMP information shown in FIG. 3 expanded as the 2-tiered version information. In FIG. 7, the construction is exactly the same as in FIG. 4, except for a version number (upper) 701 and a version number (lower) 702. Even when the IPMP information having the construction shown in FIG. 7 is contained in the multi-media data, the IPMP information can be handled in exactly the same way as the single-piece version information, except the point that the processing flow of the IPMP system is expanded.

A characteristic in the case of the 2-tiered version information is that by handling the version number (upper) 701 and the version number (lower) 702 separately, more advanced control of the IPMP information becomes possible.

For example, the version number (upper) can be a version relating to compatibility, and the version number (lower) can be a version relating to verification of fine changes in the IPMP information. In such a case, when the IPMP system type and the version number (upper) match each other, it can be determined that compatibility has been maintained. This determination would make the IPMP system processing become simpler, such that referencing to the version management table would be avoided to thereby lessen the processing load, and the amount of memory usage would be minimized.

Note that the version management table is not limited to the construction, as described in FIG. 5, being capable of performing relatively complicated defining processes. The version management table can also be configured, of course, in an abbreviated fashion such that the determination is made merely by greatness of the value of the version number, for example.

Next, explanation is made of additional instances of the present invention.

As explained in connection with example 2 (512) in FIG. 5, even in the case that the version number etc. differ, the conversion of the data contained in the data field 406 of FIG. 4 enables further simplification of the processing. An example of this is shown in FIG. 8.

The IPMP information (partial) shown in FIG. 8 shows details of fields below or after the IPMP system type shown in the example of FIG. 4. Further, a cipher code conversion table shown in FIG. 8 is one example of a conversion table for performing data conversion.

In the IPMP information (part), a cipher code before being decoded 801 is defined as one part of the data field shown in FIG. 4. Here, the method for the cipher decoding processing that should be processed before decoding the MPEG-4 stream is written in code. For example, as depicted in FIG. 8, when the IPMP information has an IPMP system type of 1000h and a version number of 02h, the cipher code before being decoded is 03h.

The IPMP system for processing this IPMP information processes the IPMP information with the IPMP system type of 1000h and version number of 02h. The IPMP system, as explained previously, can refer to the version management table and refer to the cipher code conversion table, and determine that the data conversion can be performed.

When the cipher code conversion table shown in FIG. 8 is referred to, it becomes evident that cipher code 03h of version 01h corresponds to cipher code 04h of version code 02h. For this, the cipher algorithm called RC4, for example, is applied (802).

As described above, the version number is added to the IPMP information. This can result in that changes in decoding methods, etc., which are necessary upon version changes, can be carried out easily.

The above-described embodiment pertains to multi-media data containing intellectual property rights (copyrights) management and protection information of MPEG-4 for example. However, the present invention is not necessarily only applied to MPEG-4, and can also be effectively used with multi-media data having systems relating to intellectual property rights (copyrights) management and protection similar to MPEG-4, and also with systems and players using the same.

Hereinafter, detailed explanation is made of a second embodiment of the present invention with reference to the drawings.

Figure 9:
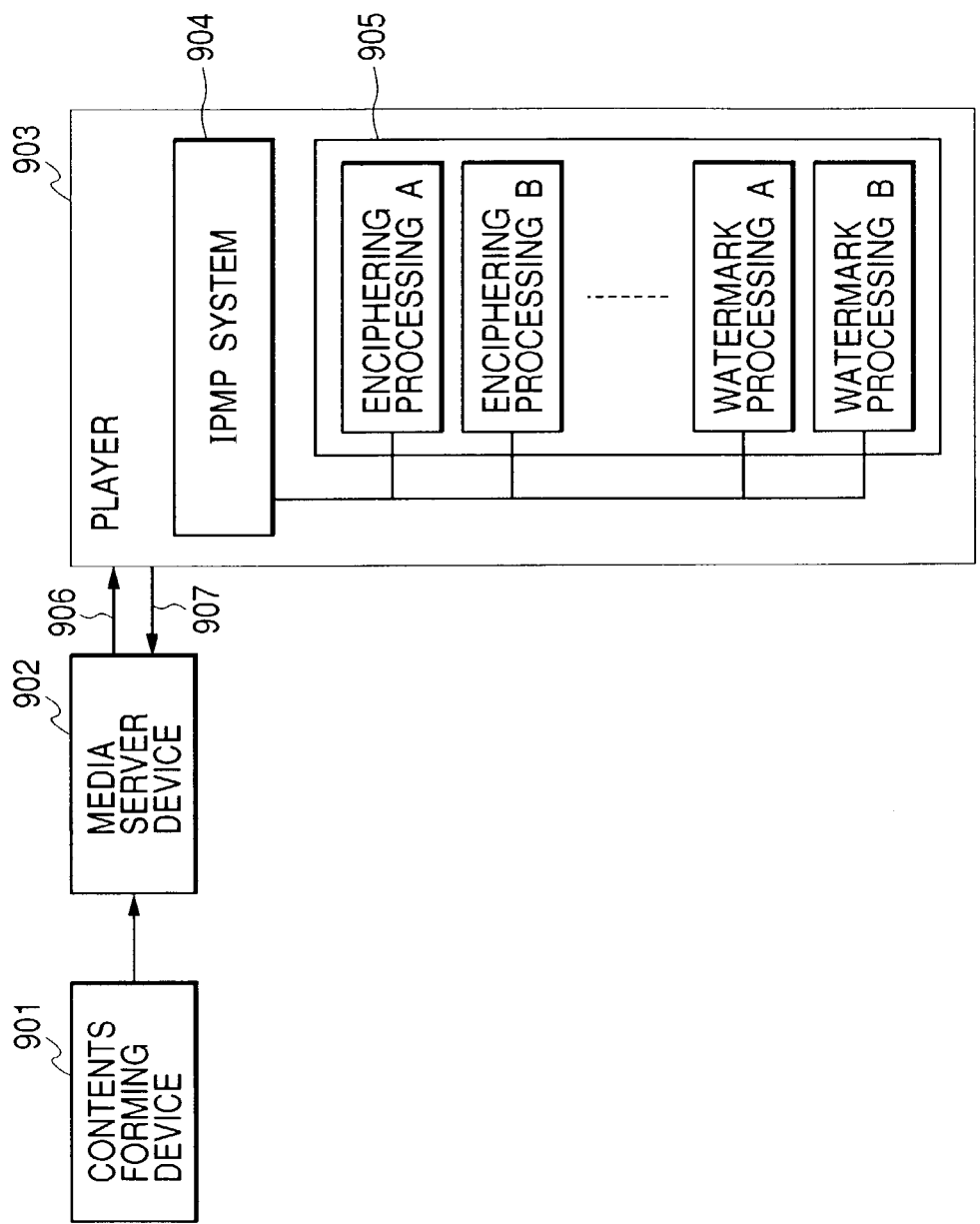
FIG. 9 is a diagram schematically explaining an entire system for explaining a second embodiment of the present invention.

FIG. 9 is a diagram schematically explaining an entire system for explaining a second embodiment of the present invention.

This system is constructed of: a contents forming device 901 for generating a stream of multi-media data containing intellectual property rights management and protection (IPMP) information of MPEG-4 for example; a media server device 902 for distributing/providing this; a player 903 being a reproducing device for requesting and reproducing multi-media data; and an IPMP system 904 for performing copyright management and protection in close interrelation with the player.

Here, in order to simplify the explanation, IPMP Roaming Format is supported.

Note that IPMP Roaming Method refers to a service of conversion into an IPMP system type that is interpretable on the side of the contents reproducing device. This IPMP Roaming Method has already been proposed by the applicant of the present invention in Japanese Patent Application Laid-open No. 2000–200014.

A device for converting IPMP is included in the contents forming device 901 and in the media server device 902 for distributing/providing this.

Further, there are instances in which the IPMP system 904 incorporates a module 905 that is used by the IPMP system 904, such as an enciphering processing module or a watermark processing module, having functions necessary for intellectual property rights management and protection.

Note that a stream 906 of multi-media data is transmitted between the media server device 902 and the player 903. This transmission relies on the system provided by the media server device 902, and there are instances in which this transmission is conducted by means of RTP (real-time transport protocol), and there are also instances in which the transmission is conducted as a pure file transfer by means of FTP (file transfer protocol). This multi-media data transfer method pertains completely to the realm of communications procedures and does not pertain to the details of the present invention.

Additionally, there are instances in which an upward stream 907 is transmitted from the player 903 toward the side of the media server device 902.

In order to make the explanation of the second embodiment simpler, explanation will first be made of an outline of the flow of the processing using the example of the entire system shown in FIG. 9.

First, the multi-media data containing IPMP information such as MPEG-4 is formed by means of the contents forming device 901. This process can be performed in advance, or can also be performed each time there is a request. What is important is that the IPMP information is included among the multi-media data and that the multi-media data includes an IPMP system type (IPMPS_Type) for uniquely identifying the protection format and includes a "command" characteristic of this embodiment (details of the command will be explained below).

The media server device 902 distributes the protected data in accordance with a request from the player 903 or specifications of the multi-media data distribution system. In other words, the distribution performed by the media server device 902 is a transmission of multi-media contents on which processing related to intellectual property rights management and protection has been performed.

The player 903 reads the multi-media data containing the protected data, and performs reproduction in accordance with a multi-media data standard. At this time, the IPMP system 904 performs processing if IPMP information is included among the multi-media data. In other words, enciphering method processing or watermark method processing corresponding to a designated IPMP system type (IPMP-S_Type) is performed. This processing can be left up to and performed by the enciphering processing module or the watermark processing module as necessary.

As a result, the enciphering processing, etc. performed on the multi-media data are decoded, and the player 903 can perform reproduction for the multi-media data.

It is assumed that the designated IPMP system type cannot be processed because the IPMP system type does not correspond with the module. In this case, when the command explained below requesting an upstream transmission (also referred to back channeling) is given, or when this command for upstream transmission is given for some other reasons, the player 903 transmits an upstream transmission 907 in accordance with the command.

Next, explanation is made of the command, being a characteristic of this embodiment.

The command is a special message operating as an order from the media server device 902 to the player 903. This embodiment is characterized in that this command is defined as a natural expansion of the normal IPMP message.

Figure 10:
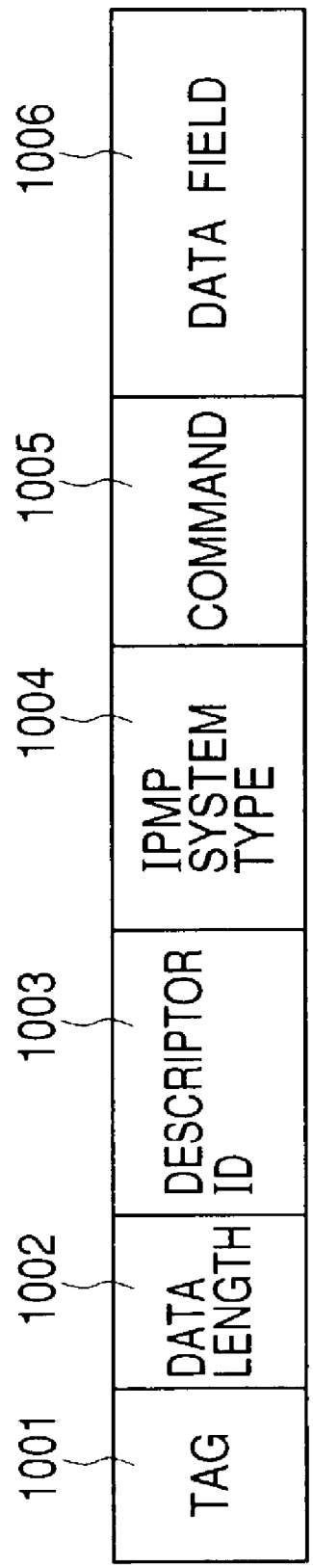
FIG. 10 is a diagram showing a construction of IPMP information containing a command in accordance with the second embodiment of the present invention.

In other words, as shown in FIG. 10, the IPMP information is constructed of a tag 1001, a data length 1002, a descriptor ID 1003, IPMP system type 1004, a command 1005 and a data field 1006. This construction has no inconsistencies whatsoever with the IPMP_Descriptor definition (8.6.13.1 Syntax) defined as the MPEG-4 version 1 standard (ISO/IEC 14496). This construction can be written in a similar fashion as follows:

```
class IPMP__Desctiptor( ) extends BaseDescriptor : bit(8)
IPMP__DescrTag{
    bit(8) IPMP__DescriptorID;
    unsigned int(16)    IPMPS__Type;
    if (IPMPS__Type == 0) {
        bit(8) URLString[sizeOfInstance-3];
    } else {
        bit(8) HasMessageType; // is there a command?
        if ( HasMessageType ) {
            bit(8) MessageType; // command
            bit(8) IPMP__data[sizeOfInstance-5];
        } else {
            bit(8) IPMP__data[sizeOfInstance-4];
        }
    }
}
```

MessageType is the command and size and name were set just for convenience here. Of course, the size and name do not influence the substance of the present invention.

Next, details of a specific definition of the command are explained. Using the above example, in the case that the definition is set at 8 bits, the MessageType field corresponding with the command is defined as follows (hereinafter, "0x" indicates that the number following "0x" is a hexadecimal numeral):

```
0x00  reserved
0x01  request_backward_message
0x02  request_error
0x04  request_system_info
0x08  request_authentication
0x10  request_secure_channel
0x20  reserved
0x40  reserved
0x80  pseudo_message
```

This definition is precisely a message structure based on a binary digit string and the logical sum of the values is valid.

For example, in the case when the player 903 receives an IPMP message including a command of 0x03 (=request_backward_message+request_error), the IPMP system 904 being built into the player 903 performs processing relating to intellectual property rights management and protection in accordance with the normal IPMP message. Simultaneously, the IPMP system 904 can know that the media server device 902 expects to return the error content when some sort of an error occurs.

Next, explanation is made of specific examples in which the above-mentioned command is used.

EXAMPLE 1

Explanation will now be made of a situation when, upon distributing the multi-media contents containing the IPMP message for performing the intellectual property rights management and protection, an error has occurred and the distributing side requests the error content of the error from the player 903 for performing contents reproduction.

At this time, the media server device 902, which is the distributing side, is waiting for transmission through the normal back channel. Further, the command 0x03 (=request_backward_message+request_error) is included in the IPMP message contained in the transmitted multi-media contents.

Figure 11:
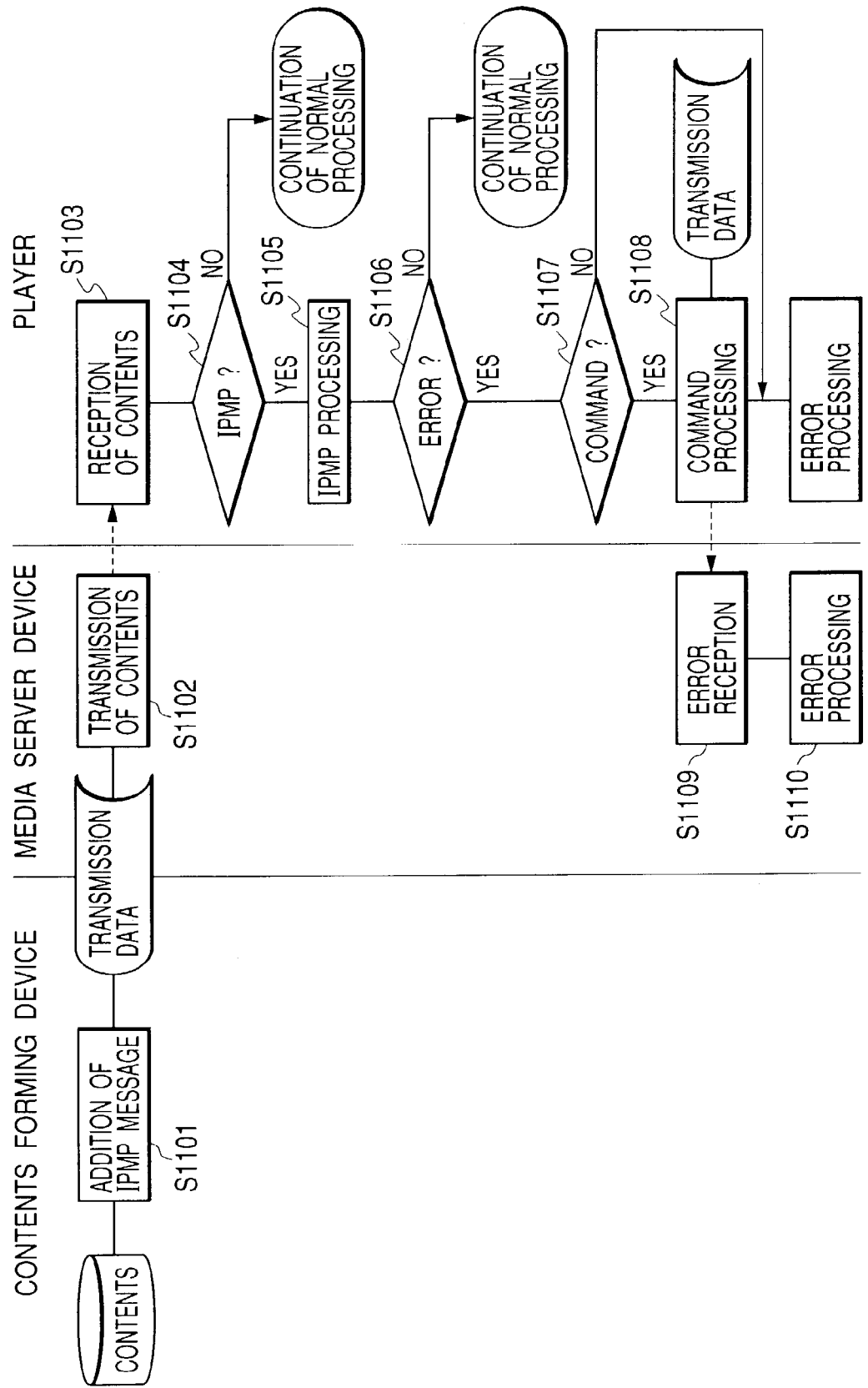
FIG. 11 is a flow chart showing a processing sequence in a case of exceptional processing, in accordance with the second embodiment of the present invention.

FIG. 11 is a flow chart showing a processing sequence in the case of exceptional processing.

First, the IPMP message containing the command "0x03" is added to the contents (step 1101). The contents that have been formed are the multi-media data having been protected by the IPMP system. The formed contents are transmitted as transmission data from the media server device 902 to the player 903.

The player 903 receives the transmitted contents (step 1103) and determines whether the contents are data that were protected by the IPMP system or not (step 1104). If the contents are the unprotected data, then normal processing is performed. This normal processing, however, is not a direct concern of the present embodiment, so explanation thereof is omitted.

On the other hand, if the contents are data having been protected by the IPMP system, the IPMP processing is then performed next (step 1105). As examples of this processing, in the case of multi-media coded audio data having undergone some kind of enciphering, decoding processing can be considered. Or in the case of video data that having been imprinted with some sort of watermark, processing for detecting this watermark can be considered.

In this way, it is desirable that the IPMP processing be conducted without abnormalities. Actually, however, there are situations in which errors occur when the processing is about to be started or occur during processing. The former example can be instances in which the IPMP system type contained in the contents cannot be processed by the player 903. The latter example can be instances in which the bits of data are lost or the data is otherwise corrupted.

If an error is detected (step 1106), then the command in the IPMP message is checked. If an error request (request_error) and a request for upstream transmission (request_backward_message) are included in the IPMP message (step 1107), then data for upstream transmission is prepared and sent to the media server device 902 (step 1108). In the case that the command does not make these requests, upstream transmission is not necessary and normal error processing takes place.

When receiving the data from the player 903 in response to the upstream transmission request (step 1109), the media server device 902 performs error processing on the server side (step 1110), for example. If this error processing consists of re-sending the contents or terminating the processing, for example, then it is also conceivable that the terminated data gets rolled back, etc. The content of this processing is left up to the application system, and the details are not mentioned here.

In this way, a server system constructed of the contents forming device 901 and the media server device 902 transmits to the player 903, which is a client, the contents data containing the IPMP message (command) for performing an error information request via the back channel. Further, the IPMP system 904, being capable of determining this contents data, makes an appropriate determination of the contents data. This determination produces the result that a mutually understandable error notification can be conducted between the client and the server in the format defined as the MPEG-4 version 1 standard (ISO/IEC 14496) or in an IPMP message information expansion proposal for supplementing insufficiencies of the MPEG-4 version 1 standard.

EXAMPLE 2

Explanation will now be made of an instance where the distributing side makes a request to the player 903 for performing contents reproduction for an IPMP system type that can be processed by the IPMP system having been built into the player in advance upon distribution of the multi-media contents containing the IPMP message for performing the intellectual property rights management and protection. This is one example of the IPMP Roaming Method mentioned above.

At this time, it is assumed here that the media server device 902, which is the distributing side, is waiting for the normal back channel transmission. Further, in order to simplify the explanation, errors are not considered here.

Figure 12:
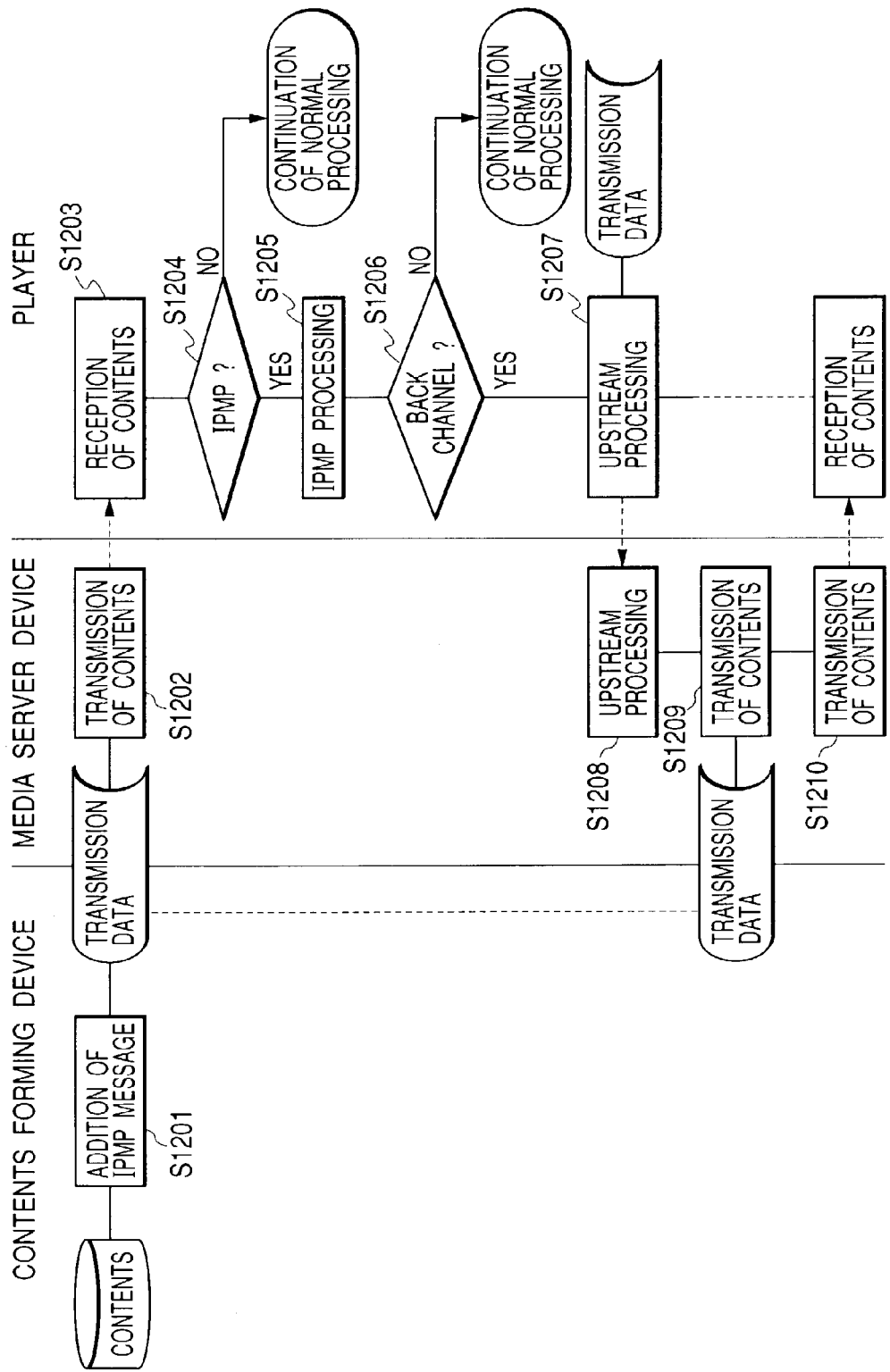
FIG. 12 is a flow chart showing a processing sequence in the case of a request for an IPMP system information notification, in accordance with the second embodiment of the present invention.

FIG. 12 is a flow chart showing a processing sequence in the case of a request for an IPMP system information notification.

First, the IPMP message containing the command for requesting the processable IPMP system type is generated (step 1201). In this example, the IPMP message may be generated as contents differing from the contents particularly requested by the player 903. In other words, the contents of the IPMP message may be the IPMP message alone without specific multi-media data contained therein.

It is assumed here that the command that has been added is 0x05 (=request_backward_message+request_system_info).

Next, the contents thus formed are transmitted as transmission data from the media server device 902 to the player 903 (step 1202).

The player 903 receives the transmitted contents (step 1203) and determines whether the transmitted contents are data that have been protected by the IPMP, which is the intellectual property rights management and protection system, or not (step 1204). If the transmitted contents are data that have been protected by the intellectual property rights management and protection system, then the IPMP processing is performed (step 1205). If the contents are simply an IPMP message not containing specific multi-media data, then the IPMP processing will not have any real effect. Further, if the command contains a command to wait for a back channel transmission (request_backward_message) and a command to request the IPMP system information (request_system_info) (step 1206), then data for the upstream transmission is formed and sent to the media server device 902 (step 1207). The upstream data includes a list of IPMP system types interpretable by the IPMP system 904 built into the player 903, etc.

When the media server device 902 receives the data from the player 903 that has been sent in response to the upstream transmission request (step 1208), operations such as the following may be performed: for example, the intellectual property rights management and protection processing that has been performed on the multi-media contents requested by the player 903 may be converted so as to be interpretable by the player 903. Alternatively, contents processing relating to intellectual property rights management and protection is performed such that contents that are suitable for the player 903 are selected among contents that have been prepared and protected in advance. (step 1209).

Subsequently, the media server device 902 sends the contents to the player 903 (step 1210).

In this example, the media server device 902 learns the processable IPMP system types and other information from the player 903, which is the client, in advance. Thus, the timing for the IPMP system information notification from the player 903 is determined before sending the contents. This is done so that the processing can be performed smoothly, but there is no limitation on this timing and method.

For example, another method of use is conceivable such that a similar command is buried into the contents that are already being transmitted, and the back channel is used to send the IPMP system information while the contents are being reproduced. Also, even in the case where the information from the IPMP system 904 built into the player 903 is being dynamically altered by means of a so-called downloadable module, or the like, a similar command can be buried into the contents in accordance with the timing of the IPMP processing. Thus, the information can be handled in a flexible fashion.

EXAMPLE 3

The IPMP message defined as the MPEG-4 version 1 standard (ISO/IEC 14496) and the IPMP system are premised upon providing the intellectual property rights management and protection system for specific reproduction of multi-media contents. The IPMP message and the protected objects, such as picture images and voice, are linked to each other by means of object descriptors, and control of these object descriptors is performed by the IPMP system. Therefore, it is possible for the IPMP system not to perform processing based on its own independent judgment, but it is impossible for the IPMP system to quit processing based on instructions from the contents.

In this example, an instance is explained in which a determination is made as to whether an error will occur or not, without performing processing to the contents.

In the IPMP message, 0x80 (=pseudo_message) is added to 0x03 (=request_backward_message+request_error), which was discussed in the first example, and thus becomes "0x83" is obtained. This pseudo_message is a command requesting the IPMP system 904 to perform interpretation of the IPMP message but not to perform specific processing on the protected objects such as picture images and voice. In this example, the flow of the operations is exactly equivalent to that of the first example 1, except for at one point. The differing point is that, namely, in the case where the IPMP processing was performed at step 1105, the specific processing of the object or objects is not performed.

This produces the result that an operation for detecting an error before occurring when the contents are about to be reproduced and the IPMP processing is about to be performed, can be buried into the IPMP message. Also, the media server device 902 for distributing the contents can perform a test or tests in advance for differences among the individual devices, corresponding to the player 903.

Similarly, this command is also effective with respect to the processing request that the detailed information about the IPMP system 904 described above in the second example is returned to the server without performing specific processing on the objects. The IPMP system 904 can be considered to have no difference whatsoever from normal processing except for the point that while conducting the superficial operations of the intellectual property rights management and protection system, the IPMP system 904 no specific processing on the objects such as picture images and voice.

EXAMPLE 4

Explanation will now be made of a situation when upon distributing the multi-media contents containing the IPMP message for performing the intellectual property rights management and protection, the distributing side requests a confirmed upstream transmission (back channel) from the player 903 for performing the contents reproduction.

In the case when an already-opened channel, or a pre-existing bi-directional contents channel or such is not used for the upstream transmission, but a new channel is used instead, there are instances in which it is desirable to confirm whether the channel in question is a request from a legitimate player 903. An example of this is when information relating to intellectual property rights management and protection is attached to the contents and this information is converted into information suitable for the player. In such a case, if it is not clear that the request is from a legitimate player, then it is not certain whether the conversion request has been made by an ill-intentioned third party.

A command 0x08 (=request_authentication) can be used for such a request from the media server device 902 or other such entity being the server system side, for "authentication" of the player 903.

Figure 13:
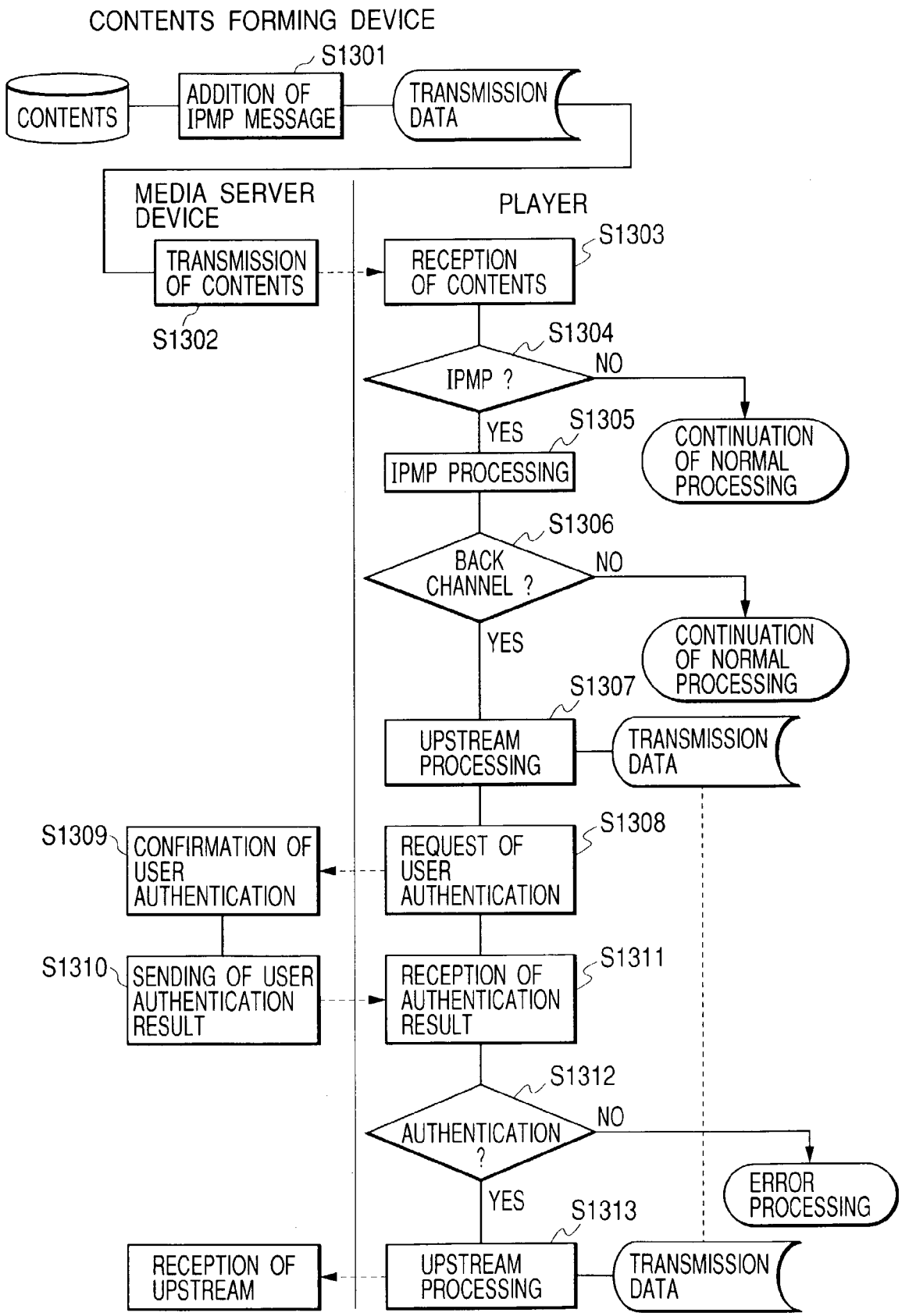
FIG. 13 is a flow chart showing a procedure sequence in the case of an authentication processing request, in accordance with the second embodiment of the present invention.

FIG. 13 is a flow chart showing a procedure sequence in the case of an authentication processing request.

First, an IPMP message containing a command for requesting a processable IPMP system type is generated (step 1301). In the present example, the command that has been added is 0x0D (=request_backward_message+request_system_info+request_authentification).

Next, the contents that have been formed are sent as transmission data from the media server device 902 to the player 903 (step 1302).

The player 903 receives the transmitted contents (step 1303), and determines whether the transmitted contents are data that have been protected by the IPMP, that is intellectual property rights management and protection system (step 1304). If the contents are data that have been protected by the intellectual property rights management and protection system, the IPMP processing is then attempted next (step 1305). If the command contains a command for waiting for a back channel transmission (request_backward_message) and a command for requesting the IPMP system information (request_system_info) (step 1306), then the data for the upstream transmission is prepared (step 1307). The flow of the processing up to this point is almost entirely the same as that of the second example above.

Next, if request_authentication is included in the command, then a user authentication (processing) request is made to the media server device 902 (step 1308). The media server device 902 performs confirmation of the user authentication (step 1309), and if the request is proper, then an authentication message is sent back. If the request is not proper, then a rejection message is sent back (step 1310). The player 903 receives the authentication message (step 1311), and in the case that the request was authenticated (step 1312), then the upstream data is sent to the media server device 902 (step 1313). The upstream data includes a list of IPMP system types interpretable by the IPMP system 904 built into the player 903, and other such information. Hereafter it is the same as in the second example, and explanation is omitted here. Further, it goes without saying that the upstream transmission and the authentication processing can be performed simultaneously.

In this way, when the server system which is constructed of the contents forming device 901, the media server device 902 and the like, requests for an upstream data transmission by a back channel in respect to the player 903 to be client, if the IPMP system 904 that can judge the request including the user authentication requests for an appropriate authentication processing request, a communication with and appropriate authentication with the server as the lead may be expected.

EXAMPLE 5

Explanation will now be made of an example, similar to the fourth example, of a security channel request from the server system. Specifically, this is a case where a request that a reply for the upstream transmission be made by means of a channel utilizing an SSL (Secure Socket Layer).

Using an example applied to the first example, the command that has been added will be 0x13 (=request_backward_message+request_error+request_secure_channel).

Generally, in the processing of so-called WWW sites which are handled by means of a combination of HTTP (Hyper Text Transfer Protocol) and HTML (Hyper Text markup Language), the employment of the SSL can be controlled and determined by means of a scheme (generally "https://" is used) buried into the HTML, which becomes the contents. However, the back channel request for the control and determination of an upstream transmission of MPEG-4 or other such multi-media contents, is not included in the IPMP message. Moreover, the security channel concept is problematic because it is not defined in the MPEG-4 version 1 standard (ISO/IEC 14496). The command of the present example can be applied in order to solve these problems.

Figure 14:
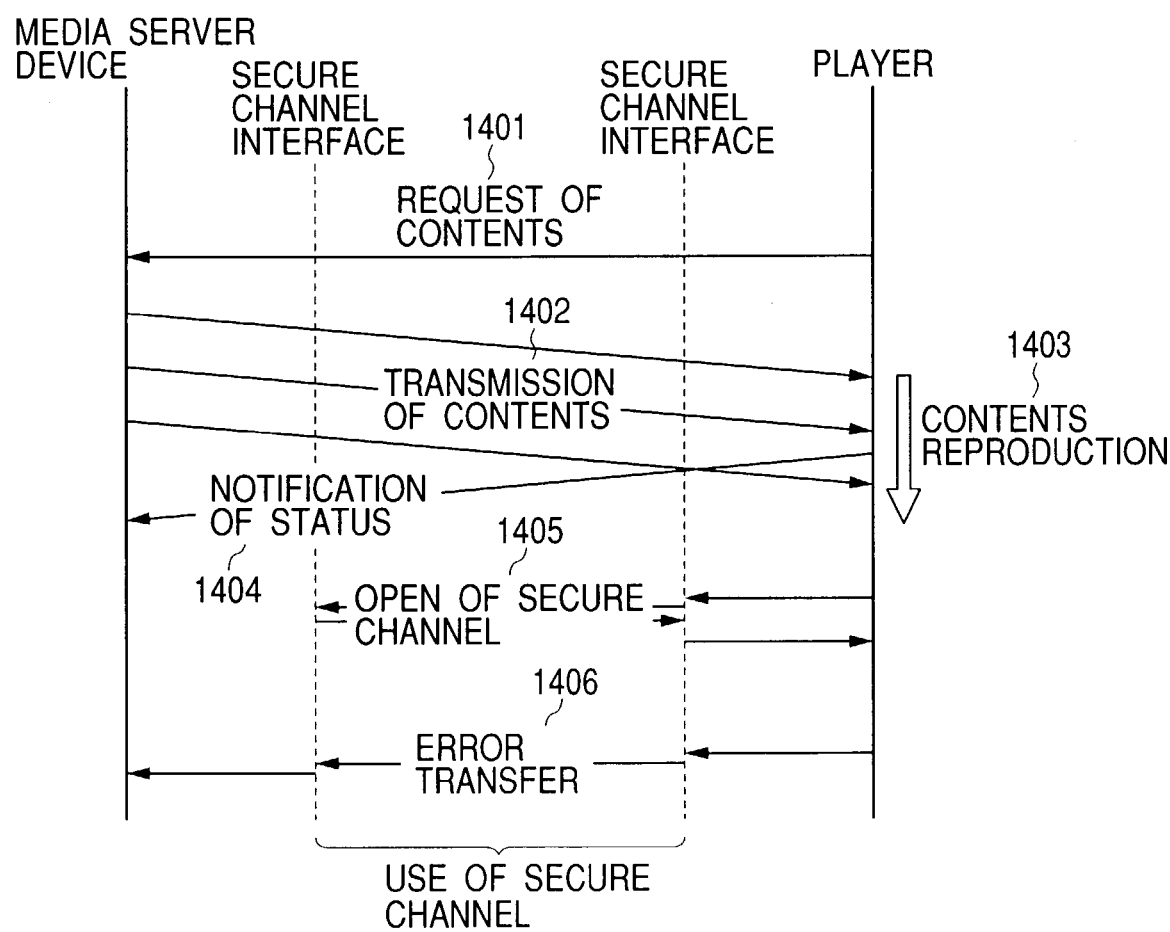
FIG. 14 is a diagram showing a processing sequence in the case of a secure communication request, in accordance with the second embodiment of the present invention.

FIG. 14 is a diagram showing a processing sequence in the case of a secure communication request.

First, a request for contents is made by the player 903 to the media server device 902 (1401). The media server device 902 begins a consecutive transmission of contents to the player 903 (1402). It is assumed here that, at this time, the contents include the IPMP message and the command contained in the IPMP message contains the request for the back channel upstream transmission of error information and the request for the secure channel for the upstream transmission.

The player performs sequential reproduction of the received contents (1403), and notifies the media server device 902 of the status (1404). In the event that an error has occurred in the processing of the IPMP information, the secure channel is opened (1405) and the error is forwarded using this channel (1406). Supplementary explanation will now be made of Examples 1 to 5 explained above.

In the examples explained so far, the media server device 902 has been explained as being an independent server on a network. However, in the present invention, the server does not necessarily have to be on a network.

For example, the media server device 902 can operate even as a local program that behaves as if it were a server on a network. One realistic example is the IPMP information conversion program proposed in connection with the above-mentioned IPMP Roaming Method.

The IPMP information conversion program is a program which can operate in the same apparatus as the player, send an imitation IPMP message to the player, and convert the designated contents for the player based on this information.

Further, there is a technology called DMIF (Delivery Multimedia Integration Framework) that has been standardized in accordance with MPEG-4, for utilizing various networks and filing systems in a watermark-type fashion. Going through a generalized interface such as this one to use the above-mentioned local program or the network-based media server device enables the present invention to be applied in a generalized method.

An example of this is shown in a schematic fashion in FIG. 15.

One the left-hand side of FIG. 15, the portion where "Content Server or Local Program" is written (1501) corresponds to the media server device 902 in FIG. 9 or the above-mentioned local program. Further, in the middle of the diagram, an "arrow (2)" (1502) and an "arrow (4)" (1503) indicating a flow of data toward the player side, are none other than the data stream from the so-called server side. IPMP messages with commands added thereto are contained in these streams, and the player is able to send back the necessary data without concern for the network interface.

As a result, the present invention can also be applied in instances when contents having intellectual property rights management and protection information (an IPMP message) embedded in them are recorded in a storage medium such as a floppy disk, hard disk, optical disk, optical magnetic disk, CD-ROM, magnetic tape, an non-volatile memory card, ROM, in advance.

Further, the embodiments described in Examples 1 to 3 were instances in which the so-called back channel transmission is expected from the media server device or a similar communication local program which interact with the contents providing side. However, by not setting the command to perform the communication request, it is possible to implement the invention even in a mode whereby the intellectual property rights management and protection system does not have to perform a transmission in order to send a notification, and for example, may notify an application program having a log output or an intellectual property rights management and protection system and interface.

The examples explained above relate to multi-media data containing intellectual property rights management and protection information of MPEG-4 for example; however, application of the present invention is not necessarily limited to MPEG-4 alone. The present invention is also effective for multi-media data having structure relating to intellectual property rights management and protection similar to MPEG-4, and systems and players utilizing the same.

As seen in the various examples mentioned so far, the present invention enables exceptional instances (errors, etc.) which were complicated or tended to be complicated and operational inconveniences that occurred with the conventional MPEG-4 and with similar multi-media encoding methods having intellectual property rights management and protection systems similar to MPEG-4, and occurred also with IPMP message information expansion proposals that were proposed for expanding these methods, to be handled by operations having a simplified method, whereby instructions are issued for the contents reproducing device to send notifications to the side sending the contents.

Further, even in the case when it is necessary to transmit the intellectual property rights management and protection system information via the IPMP Roaming Method so-called back channel transmission which is a similar expansion proposal, this request and transmission can be performed by operations in a simplified method whereby instructions are issued for the contents reproducing device to send notifications to the side sending the contents.

Additionally, even in the case when there are no specific contents, it is possible to perform tests of the conditions by means of a standard technique.

Additionally, it is possible to perform tests of intellectual property rights management and protection systems during reproduction of the contents without influencing the reproduction of the contents.

Related to the above, it is possible to perform a request that the communication path for the so-called "back channel" from the contents reproducing device to the side that contents are sent to be protected by security technology.

As a result, with the realization of the above aspects, a method is thus provided which not only makes it easier to guarantee the mutual compatibility between each of the devices, but also avoids complicated processes dependent on the separate devices and systems, with the result that the method is effective even when there are limitations on program size.

As explained above, the above embodiment enables the intellectual property rights management and protection system in the multi-media encoding method to perform transmission of messages (commands) such as "notification of exceptions (error notification)", "information request for IPMP system type, etc." and "operational condition instructions" to the contents reproducing device in a simpler and more generalized method. Thus, a superior effect is achieved in which the intellectual property rights management and protection of the multi-media contents can be conducted effectively.

Also, conventionally, the operations of the server and the player relating to the command instructions had to be communicated to each of the other individual systems, and thus created complications in synchronization. However, an effect is achieved whereby it becomes possible to synchronize these operations and handle these operations as standardized stream data. Even in the case when the device has a limitation on program size, it becomes easy to secure compatibility among the devices by relying on the standard.

This embodiment as explained above enables more efficient processing by burying various command information into the information for intellectual property management and protection in accordance with the method of MPEG-4, which has the intellectual property rights management and protection system, or in a similar encoding method that has an intellectual property rights management and protection system.

INDUSTRIAL APPLICABILITY

It is possible to apply the present invention to a system being constructed of a plurality of apparatuses (for example, a host computer, an interface apparatus, a leader, a printer, etc.), or to a device comprised of a single apparatus (for example, a DVD player).

Further, there is also a case where a software program code for realizing the functions of the above embodiments is provided to a device or to a system computer. In this case, the device or the system computer which is connected to a variety of devices in order to make this variety of devices operate to realize the functions of the embodiments described above. In a case such as this, the thing which is reduced to practice by making this variety of devices operate based on the program that is stored in the device or in the system computer (CPU or MPU) is included in the scope of the present invention.

Further, in this case, the above-mentioned software program code itself realizes the functions of the embodiments described above, and the program code itself and the means for providing the program code to the computer, such as a storage medium storing the related program code, for example, comprises the present invention.

A floppy disk, a hard disk, an optical disk, an optical magnetic disk, a CD-ROM, magnetic tape, a non-volatile memory card, ROM or the like, can be used for the storage medium for storing the program code.

Further, it goes without saying that the program code is included as an embodiment of the present invention not only in the case when execution of the program code provided to the computer produces the result that the above-mentioned functions of the embodiments are realized, but also in the case when the program code realizes the embodiments of the present invention in a joint fashion together with an OS (operating system) running on the computer, or with another application soft, etc. Additionally, there is a case in which the program code having been delivered to the computer is first stored in a memory provided to a functions-expansion board of the computer or to a functions expansion unit connected to the computer. Then the functions-expansion board or a CPU, or the like being provided to the functions-expansion unit, perform the actual processing or a part of the processing based on the instructions from the program code. Of course, it goes without saying that the case where this processing realizes the functions of the above embodiments are also included in the present invention.

The invention claimed is:

1. A contents forming method for multi-media encoding method provided with an intellectual property rights management and protection system, said contents forming method comprising the steps of:

generating intellectual property rights management and protection information containing identification information for identifying the intellectual property rights management and protection system type and version information for identifying the intellectual property rights management and protection system version; and burying the intellectual property rights management and protection information into contents.

2. A contents forming method according to claim 1, wherein the version information is used to determine compatibility of the intellectual property rights management and protection system.

3. A contents forming method according to claim 1, wherein the version information is used to determine changes in the intellectual property rights management and protection system.

4. A contents forming method according to claim 1, wherein the multi-media encoding method is a method for encoding objects on an object basis.

5. A contents forming method according to claim 4, wherein one of the objects is picture image information.

6. A contents forming method according to claim 4 or 5, wherein one of the objects is voice information.

7. A contents forming method according to claim 1, wherein the intellectual property rights management and protection system protects and manages a copyright or copyrights.

8. A contents forming method according to claim 1, wherein the intellectual property rights management and protection system performs digital watermark processing on the contents.

9. A contents forming method according to claim 1, wherein the intellectual property rights management and protection system performs enciphering processing on the contents.

10. A computer readable storage medium storing a program for executing the contents forming method as claimed in any one of claims 1 to 5 or 7 to 9.

11. A contents reproducing method for multi-media encoding method provided with an intellectual property rights management and protection system, said contents reproducing method comprising the steps of:
  inputting contents into which intellectual property rights management and protection information has been buried, the intellectual property rights management and protection information containing identification information for identifying the intellectual property rights management and protection system type and version information for identifying the intellectual property rights management and protection system version;
  detecting the identification information and the version information; and
  making the intellectual property rights management and protection system operate in accordance with the detection results in said detecting step.

12. A contents reproducing method according to claim 11, wherein information having been encoded on an object basis is included in the contents.

13. A contents reproducing method according to claim 11, wherein picture image information is included as one of the objects.

14. A contents reproducing method according to claim 11 or 13, wherein voice information is included as one of the objects.

15. A contents reproducing method according to claim 11, wherein the intellectual property rights management and protection system controls contents reproduction operations.

16. A contents reproducing method according to claim 11, wherein a compatible intellectual property rights management and protection system is determined from the identification information and the version information.

17. A contents reproducing method according to claim 16, wherein the identification information and the version information are converted into identification information and version information of the compatible intellectual property rights management and protection system.

18. A contents reproducing method according to claim 11, wherein digital watermark processing has been performed on the contents, and the intellectual property rights management and protection system decodes the digital watermark processing.

19. A contents reproducing method according to claim 11, wherein enciphering processing has been performed on the contents, and the intellectual property rights management and protection system decodes the enciphering processing.

20. A computer readable storage medium storing a program for executing the contents reproducing method as claimed in any one of claims 11 to 13 or 15 to 19.

21. A contents reproducing apparatus for multi-media encoding method provided with an intellectual property rights management and protection system, said contents reproducing device comprising:
  an input means for inputting contents into which intellectual property rights management and protection information has been buried, the intellectual property rights management and protection information containing identification information for identifying the intellectual property rights management and protection system type and version information for identifying the intellectual property rights management and protection system version;
  a detecting means for detecting the identification information and the version information; and
  a control means for making the intellectual property rights management and protection system operate in accordance with the detection results of said detecting means.

22. A contents forming method for multi-media encoding method provided with an intellectual property rights management and protection system, said contents forming method comprising the steps of:
  generating intellectual property rights management and protection information containing the intellectual property rights management and protection system type and a request for notification when an exception occurs; and
  burying the intellectual property rights management and protection information into contents in a form of a message used by the intellectual property rights management and protection system.

23. A contents forming method for multi-media encoding method provided with an intellectual property rights management and protection system, said contents forming method comprising the steps of:
  generating intellectual property rights management and protection information containing the intellectual property rights management and protection system type; and a request for notification of information about the intellectual property rights management and protection system; and
  burying the intellectual property rights management and protection information into contents in a form of a message used by the intellectual property rights management and protection system.

24. A contents forming method for multi-media encoding method provided with an intellectual property rights management and protection system, said contents forming method comprising the steps of:

generating intellectual property rights management and protection information containing the intellectual property rights management and protection system type and information notifying the data is imitation data on which processing relating to multi-media encoding is not actually to be performed; and burying the intellectual property rights management and protection information into contents in a form of a message used by the intellectual property rights management and protection system.

25. A contents forming method for multi-media encoding method provided with an intellectual property rights management and protection system, said contents forming method comprising the steps of:

generating intellectual property rights management and protection information containing the intellectual property rights management and protection system type and a communication request; and burying the intellectual property rights management and protection information into contents in a form of a message used by the intellectual property rights management and protection system.

26. A contents forming method for multi-media encoding method according to claim 25 provided with an intellectual property rights management and protection system, said contents forming method comprising the steps of:

generating intellectual property rights management and protection information containing the intellectual property rights management and protection system type and an authentication processing request in connection with the communication request; and burying the intellectual property rights management and protection information into contents in a form of a message used by the intellectual property rights management and protection system.

27. A contents forming method for multi-media encoding method provided with an intellectual property rights management and protection system, said contents forming method comprising the steps of:

generating intellectual property rights management and protection information containing the intellectual property rights management and protection system type and a request for secure communications protected by means of ciphering or another technology, the request being made in connection with the communication request; and burying the intellectual property rights management and protection information into contents in a form of a message used by the intellectual property rights management and protection system.

28. A contents forming method according to any one of claims 22 to 27, wherein functions of the intellectual property rights management and protection information are assigned in bits and can be synthesized to each other.

29. A contents forming method according to any one of claims 22 to 26, wherein the multi-media encoding method encodes objects on an object basis.

30. A contents forming method according to any one of claims 22 to 26, wherein the object includes picture image information.

31. A contents forming method according to any one of claims 22 to 26, wherein the object includes voice information.

32. A contents forming method according to claim 30, wherein the object includes voice information.

33. A contents forming method according to any one of claims 22 to 26, wherein the intellectual property rights management and protection system protects and manages copyrights.

34. A contents forming method according to any one of claims 22 to 26, wherein the intellectual property rights management and protection system performs digital watermark processing on the contents.

35. A contents forming method according to any one of claims 22 to 26, wherein the intellectual property rights management and protection system performs enciphering processing on the contents.

36. A contents forming method according to any one of claims 22 to 26, wherein the multi-media encoding method is an MPEG-4 encoding method.

37. A computer readable storage medium storing a program for executing the contents forming method as claimed in any one of claims 22 to 26.

38. A contents reproducing method for reproducing contents formed by the method of any one of claims 22 to 26, said contents reproducing method reproducing contents encoded by a multi-media encoding method including an intellectual property rights management and protection system, said contents reproducing method comprising the steps of:

inputting the contents; and reproducing the inputted contents, said reproducing step comprising a step of detecting intellectual property rights management and protection information among the inputted contents and a step of making the intellectual property rights management and protection system operate based on the detection results of said detecting step.

39. A contents reproducing method according to claim 38, wherein information having been encoded on an object basis is included in the contents.

40. A contents reproducing method according to claim 39, wherein picture image information is included as one of the objects.

41. A contents reproducing method according to claim 38, wherein voice information is included as one of the objects.

42. A contents reproducing method according to claim 40, wherein voice information is included as one of the objects.

43. A contents reproducing method according to claim 38, wherein the multi-media encoding method is an MPEG-4 encoding method.

44. A contents reproducing method according to claim 38, wherein the intellectual property rights management and protection system includes any one or combination of the steps of:

processing for notifying a contents distribution source at a time when an exceptional error occurs;

processing for providing notification of system information about the intellectual property rights management and protection system;

processing of intellectual property rights management and protection processing, without performing actual processing related to multi-media encoding;

processing for a secure communications request; and processing for an authentication request regarding the contents distribution source.

45. A contents reproducing method according to claim 44, wherein digital watermark processing has been performed on the contents; and the intellectual property rights management and protection system decodes the digital watermark processing.

46. A contents reproducing method according to claim 38, wherein ciphering processing has been performed on the contents, and the intellectual property rights management and protection system decodes the ciphering processing.

47. A computer readable storage medium storing a program for executing the contents reproducing method as claimed in claim 38.

48. A contents reproducing apparatus for reproducing contents formed by the method fo any one of claims 22 to 26, said contents reproducing device reproducing contents encoded by a multi-media encoding method including an intellectual property rights management and protection system, said apparatus comprising:

an input means for inputting the contents; and a reproducing means for reproducing the inputted contents, the reproducing means further comprising means for detecting intellectual property rights management and protection information among the inputted contents and making the intellectual property rights management and protection system operate based on the detection results.

* * * * *

UNITED STATES PATENT AND TRADEMARK OFFICE
CERTIFICATE OF CORRECTION

PATENT NO. : 7,099,491 B2 Page 1 of 1
APPLICATION NO. : 10/276808
DATED : August 29, 2006
INVENTOR(S) : Masahiko Takaku It is certified that error appears in the above-identified patent and that said Letters Patent is hereby corrected as shown below:

COLUMN 3:
Line 19, "the indentifica-" should read --identifia- --.

COLUMN 12:
Line 21, "back" should read --as back--.

COLUMN 18:
Line 57, "an" should read --a--.

COLUMN 20:
Line 15, "leader," should read --reader,--.
Line 47, "soft," should read --software,--.
Line 57, "are" should read --is--.

COLUMN 22:
Line 21, "device" should read --apparatus--.

COLUMN 25:
Line 12, "fo" should read --of--.
Line 13, "device" should read --apparatus--.

Signed and Sealed this

First Day of May, 2007

JON W. DUDAS
*Director of the United States Patent and Trademark Office*